Sept. 1, 1925.

L. E. WHITE

CHUCK FOR BIT BRACES

Filed July 15, 1924

1,552,253

Inventor
Leverett E. White
by Seymour Earle
Atty

Patented Sept. 1, 1925.

1,552,253

UNITED STATES PATENT OFFICE.

LEVERETT E. WHITE, OF SOUTHINGTON, CONNECTICUT, ASSIGNOR TO THE PECK STOW & WILCOX CO., OF SOUTHINGTON, CONNECTICUT, A CORPORATION.

CHUCK FOR BIT BRACES.

Application filed July 15, 1924. Serial No. 726,065.

*To all whom it may concern:*

Be it known that I, LEVERETT E. WHITE, a citizen of the United States, residing at Southington, in the county of Hartford and State of Connecticut, have invented a new and useful Improvement in Chucks for Bit Braces; and I do hereby declare the following, when taken in connection with the accompanying drawings and the characters of reference marked thereon, to be a full, clear, and exact description of the same, and which said drawings constitute part of this application, and represent, in—

Figure 1:
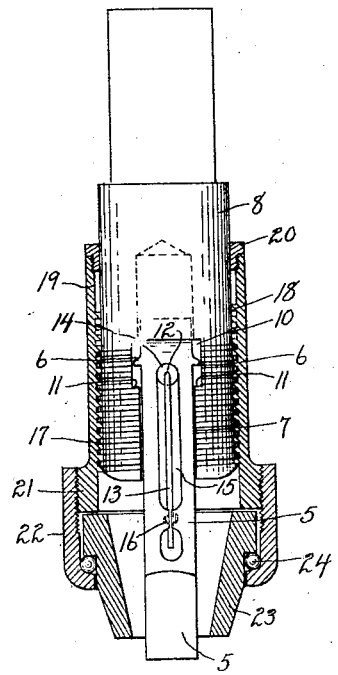

Fig. 1 a view in elevation of my improved chuck for bit-braces, with its sleeve and the parts directly connected therewith in longitudinal, central section.

Figure 2:
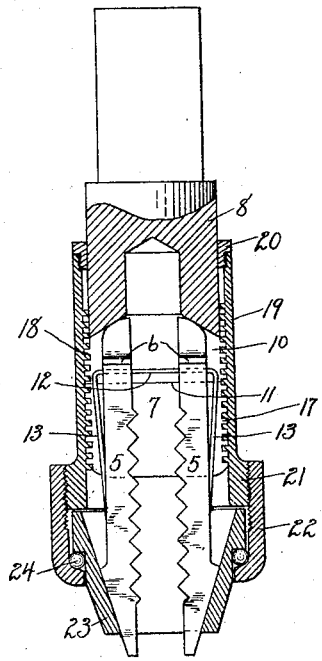

Fig. 2 a view of the chuck in longitudinal section, taken at a right angle to Fig. 1.

Figure 3:
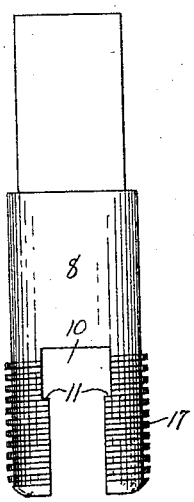

Fig. 3 a detached view, in elevation, of the shank of the chuck.

Figure 4:
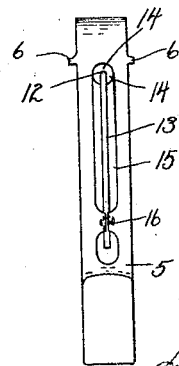

Fig. 4 a detached, edge view of the jaw-unit.

My invention relates to an improvement in chucks for bit-braces, the object being to produce a simple, sturdy, convenient and effective chuck, constructed with particular reference to providing for the easy removal and replacement of its jaw-unit without demounting the chuck from the crank of the bit-brace.

With these ends in view, my invention consists in a bit-brace chuck characterized by having its jaws and shank respectively formed with co-acting coupling-members, whereby the jaws are limited in longitudinal play and whereby they may be laterally removed as a unit from the jaw-receiving slot of the shank without disconnecting the shank from the crank of the brace.

My invention further consists in a chuck for bit-braces, having certain details of construction and combinations of parts as will be hereinafter described and particularly pointed out in the claim.

In carrying out my invention, as herein shown, each of the two jaws 5 is provided, near its inner end, with a pair of oppositely-located coupling-members in the form of riblike abutments 6 extending transversely to the axes of the jaws. For the reception of these ribs, the opposite walls of the inner end of the transverse, jaw-receiving slot 7 in the shank 8 is transversely recessed as at 10 to produce coupling-members in the form of transverse shoulders 11, with which the said abutments 6 engage, to limit the outward movement of the jaws.

To provide for the movement of the jaws in unison, they are united by a U-shaped spring-clip comprising a reach 12 and complementary arms 13, the said reach passing through transverse holes 14 in the inner ends of the jaws, and the said spring-arms 13 lying in shallow, longitudinal grooves 15, formed in the outer faces of the jaws to which they are secured, as shown, by having localized portions 16 of the metal of the jaws peened over them. As thus united, the two jaws and the said spring form a jaw-unit handled as one piece.

As herein shown, the shank 8 is provided with offstanding threads 17, engaging with the internal threads 18 of a sleeve 19, provided at its inner end with a stop-collar 20 and at its outer end formed with an externally-threaded shoulder 21 for the application of an internally-threaded coupling-ring 22, receiving a cone 23 co-acting with the beveled outer ends of the jaws. A series of anti-friction balls 24 is installed between the said collar and cone.

To remove the jaw-unit, it is only necessary to unscrew the stop-collar 20 from the sleeve 18, which is then unscrewed from the shank, after which the jaw-unit may be slipped transversely out of the jaw-receiving slot 7, thus removing the jaws without disconnecting the shank 8 from the crank (not shown) of the bit-brace. To replace the jaws, the steps above specified are reversed.

It is obvious that in practicing my invention, the inner ends of the jaws might be recessed to produce transverse shoulders for co-action with abutments projecting into the jaw-receiving slot of the shank, this being a reversal of the construction shown and described.

I would, therefore, have it understood that I do not limit myself to the exact construction shown and described, but hold myself at liberty to make such departures therefrom as fall within the spirit and scope of my invention.

I claim:

In a chuck for bit-braces, the combination with an externally-threaded shank having a transverse, jaw-receiving slot, the opposite walls of the inner ends of which are recessed, of an internally-threaded, jaw-operating sleeve applied to the said shank, and a jaw-unit comprising two jaws and a spring, the inner ends of the said jaws being provided with oppositely-located, transversely-arranged abutments co-acting with the shoulders produced by recessing the shank, to limit the outward movement of the jaw-unit in the said slot, whereby the jaw-unit may be transversely introduced and removed from the said slot without removing the shank from the crank of the tool, the said recesses and shoulders being relatively proportioned to permit the jaw-unit to have longitudinal movement with respect to the said shank and sleeve to allow the respective jaws to automatically accommodate themselves to the tapered shank of a tool introduced between them.

In testimony whereof, I have signed this specification.

LEVERETT E. WHITE.